United States Patent [19]

Mellor et al.

[11] Patent Number: 4,863,135
[45] Date of Patent: Sep. 5, 1989

[54] ADJUSTABLE SUPPORT DEVICE

[75] Inventors: John R. Mellor, Sandringham; Duncan R. Patton, Armadale, both of Australia

[73] Assignee: John Mellor Pty, Limited, Hampton, Australia

[21] Appl. No.: 281,570
[22] PCT Filed: Mar. 12, 1987
[86] PCT No.: PCT/AU87/00067
§ 371 Date: Sep. 12, 1988
§ 102(e) Date: Sep. 12, 1988
[87] PCT Pub. No.: WO87/05679
PCT Pub. Date: Sep. 24, 1987

[30] Foreign Application Priority Data

Mar. 12, 1986 [AU] Australia ............... PH5003

[51] Int. Cl.⁴ .............................................. A47H 1/10
[52] U.S. Cl. ..................... 248/328; 248/493
[58] Field of Search ............. 248/304, 328, 493, 505, 248/317, 490, 494; 211/113

[56] References Cited

U.S. PATENT DOCUMENTS

| | | | |
|---|---|---|---|
| 1,010,633 | 12/1911 | Jacobson | 248/493 X |
| 1,545,889 | 7/1925 | Everson | 248/493 X |
| 1,657,088 | 1/1928 | Maskow | 248/493 |
| 1,797,815 | 3/1931 | Bernhard | 248/493 |
| 2,686,641 | 8/1954 | Friedrich | 248/490 |
| 2,934,301 | 4/1960 | Langert | 248/328 |
| 3,596,392 | 8/1971 | Vani | 40/156 |
| 4,244,549 | 1/1981 | Oldfield | 248/494 |
| 4,566,665 | 1/1986 | Rynearson | 248/493 X |

FOREIGN PATENT DOCUMENTS

| | | | |
|---|---|---|---|
| 0011021 | of 1923 | Australia . | |
| 1144579 | 2/1963 | Fed. Rep. of Germany . | |
| 0707337 | 7/1931 | France | 248/328 |
| 0192248 | 2/1923 | United Kingdom . | |

Primary Examiner—Ramon O. Ramirez
Attorney, Agent, or Firm—Finnegan, Henderson, Farabow, Garrett & Dunner

[57] ABSTRACT

An adjustable support device (1) that can be attached to a ceiling or a wall to provide a simple, multi-purpose storage system. The device is used in connection with a cord (7) having one end held within a hollow body portion (3) and having the other free end threaded through first, second and third openings (21, 23, 25) that communicate with the interior of the device, to form a loop (9) external to, and supported by the device. Means for locking (17) the cord are provided in the device, so that pulling on the external loop does not alter the length of the loop, whereas pulling on the free end (14) of the cord shortens the loop. The device is provided with a hook member (11) adapted to cooperate with the body portion to support the external loop.

10 Claims, 3 Drawing Sheets

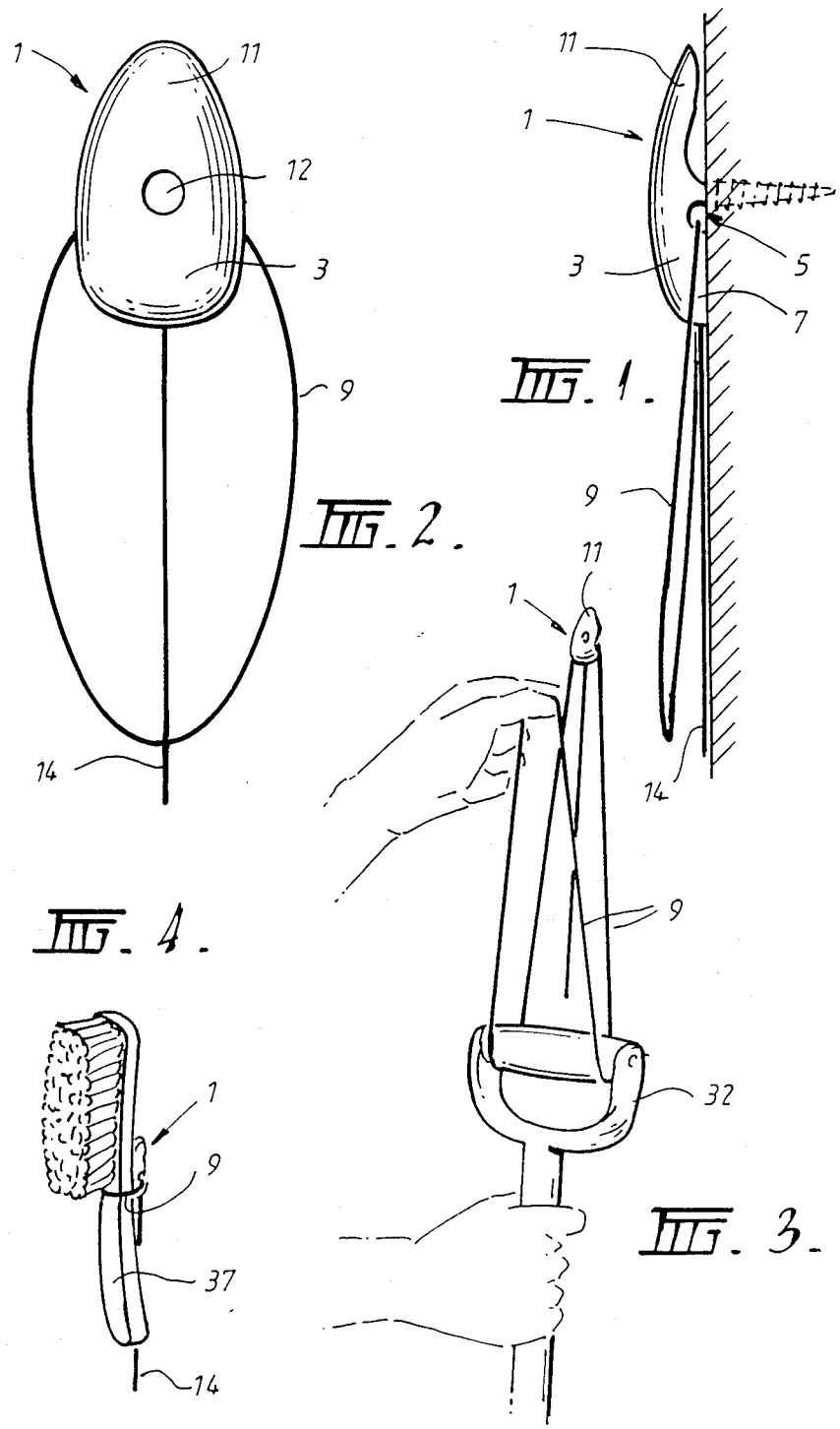

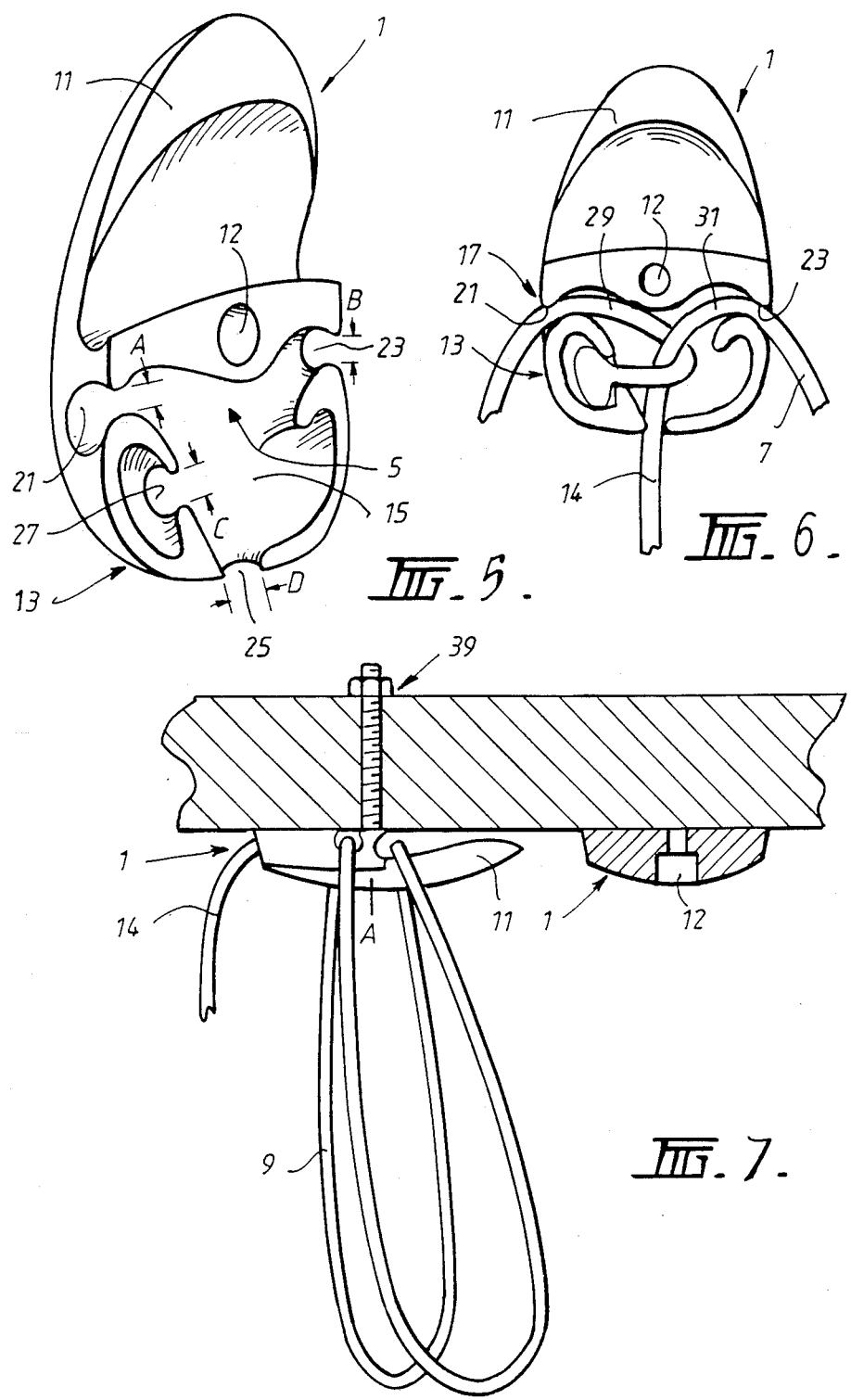

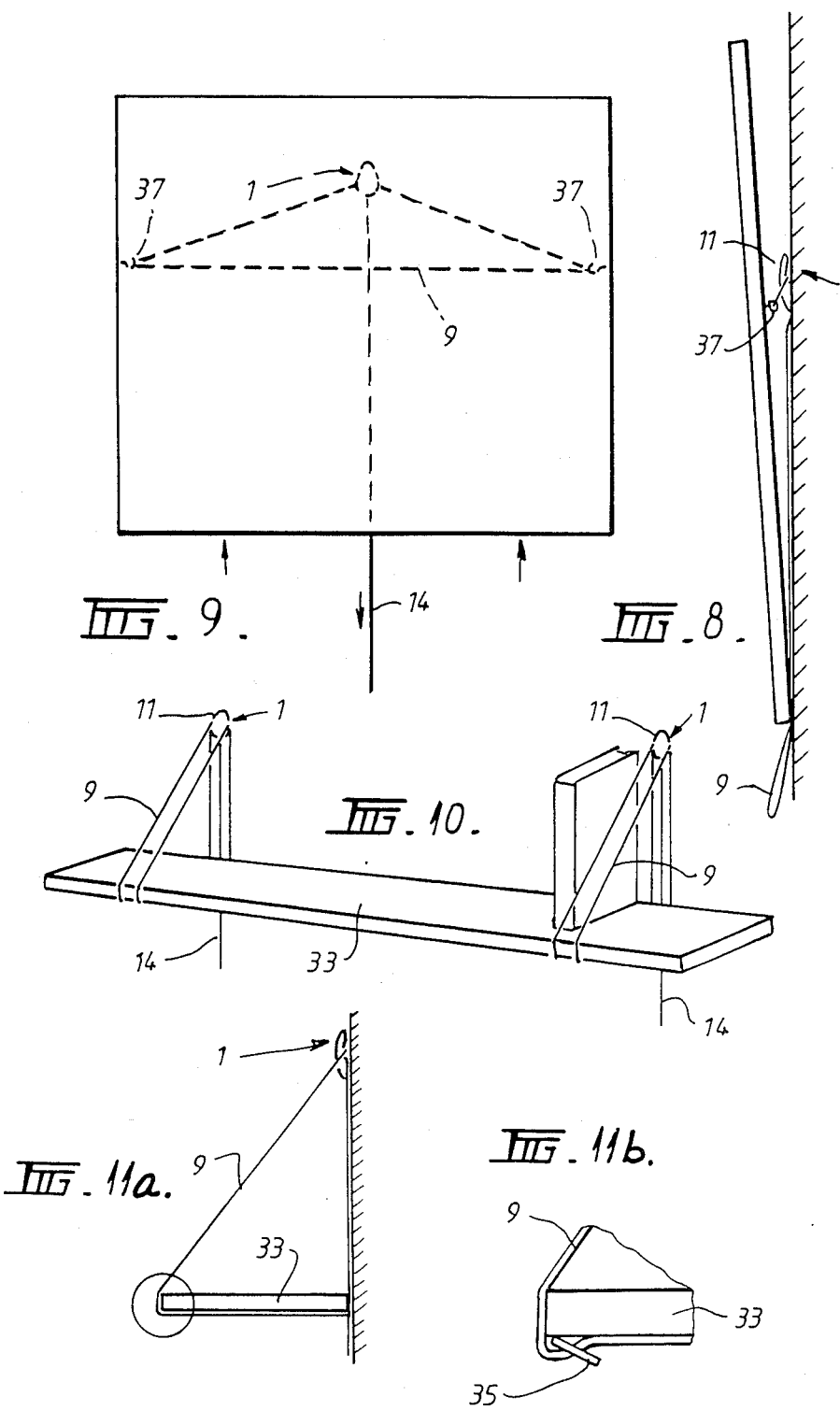

ADJUSTABLE SUPPORT DEVICE

FIELD OF THE INVENTION

The present invention relates to an adjustable support device for attachment to a surface. It relates particularly, but not exclusively, to a device which is attachable to a ceiling or a wall for supporting a great diversity of objects by means of an elongate flexible member associated with the device and/or a hook member which may be integral with the device.

The present invention was developed with a view to providing a simple, low cost, multi-purpose storage system.

DESCRIPTION OF THE PRIOR ART

There is commonly available a very wide variety of cup hooks, nails, pegs, knobs, brackets and other support fixtures from which a multiplicity of household and garage items may be suspended. Such arrangements are well suited for supporting objects provided with a recess or a loop which may be hooked over a protruding portion of the support fixture. If no such provision is made on the object then it is necessary to use wire or string tied to the object to form a loop which may be hooked onto the support fixture.

These known methods of storage have certain disadvantages and are often unsafe as they rely on the availability of string or wire and on the integrity of the tied knots or the twisted wires. An object suspended from the cup hook or peg by wire or string can easily be knocked off its support. Furthermore such hooks, brackets and other support fixtures are of limited utility and tend to protrude substantially from the surface to which they are attached, and may therefore cause bodily injury or damage to clothing when not in use.

The present invention is an improvement over such prior art support fixtures and attempts to overcome one or more of the abovementioned problems.

STATEMENT OF THE INVENTION

According to the present invention there is provided an adjustable support device for attachment to a surface, said device comprising:

a body portion having a passage extending therethrough, said passage being adapted to receive an elongate flexible element therein;

means provided in connection with said body portion for retaining one end of such an elongate flexible element whereby, in use, an elongate flexible element can be arranged in said passage and held at one end by said retaining means, a portion of said flexible element forming a loop external to and supported by, said device and wherein, in use, the length of said loop may be adjusted by pulling on a portion of the flexible element extending from said passage.

Preferably said body portion is hollow and said passage communicates with the interior of said body portion.

Preferably the passage extends between first and second openings provided on opposite sides of the device and the device is provided with an elongate flexible element having one end held in the retaining means and having the free end threaded through the first opening and the second opening to form a loop external to, and supported by the device.

In a preferred embodiment the elongate flexible element is a cord.

BRIEF DESCRIPTION OF THE DRAWINGS

In order that the invention can be more clearly ascertained a preferred embodiment of the support device according to the present invention will now be described, by way of example only, with reference to the accompanying drawings wherein:

FIG. 1 is a side view of a preferred embodiment of the support device attached to a wall by means of a single screw;

FIG. 2 is a front view of the device shown in FIG. 1;

FIG. 3 illustrates one application of the preferred embodiment of the device shown in FIG. 1;

FIG. 4 illustrates a second application of the same embodiment;

FIG. 5 is a perspective rear view of the support device of FIG. 1;

FIG. 6 is a rear view of the embodiment illustrated in FIG. 5 showing a preferred arrangement of a cord inside the body of the device;

FIG. 7 is a side view of the same embodiment attached to a horizontal surface;

FIG. 8 is a side view of a picture frame suspended from the support device in the conventional manner;

FIG. 9 illustrates an alternative method of suspending a picture frame using the same support device;

FIG. 10 illustrates a further application of the present invention comprising a bookshelf; and, FIG. 11 is a side view of the bookshelf illustrated in FIG. 10.

DETAILED DESCRIPTION OF THE PREFERRED EMBODIMENT

Referring to FIGS. 1 and 2 there is shown generally at 1 a preferred embodiment of the support device according to the present invention. Support device 1 comprises a body portion 3, and a hook member 11 formed integral therewith and extending outwards therefrom and curved towards the surface on which the support device is attached. The device is contoured to have an egg-shaped profile, though of course any aesthetically pleasing external appearance may be adopted. In FIG. 2 there is shown located substantially centrally of the support device a hole 12 through which a screw, a bolt, a nail or other attaching means may be provided for attachment of the device to a ceiling or a wall surface.

In an alternative embodiment the support device 1 is provided with an adhesive substance instead of hole 12, for attaching the device to a surface. This alternative embodiment is particularly suited to domestic applications where objects to be supported by the device are lightweight and where drilling a hole into the wall or ceiling surface may be undesirable.

The body portion 3 of the device is provided with a passage extending therethrough, shown generally at 5 in FIG. 1, through which there may be provided a cord 7 forming a loop 9 external to the device. In this embodiment the cord 7 is held at one end interior of the device and the other free end is threaded through a further opening provided at the bottom end of the device and extends downward forming a cord tail 14. In an alternative arrangement (not illustrated) the free end of cord 7 is simply threaded back through the passage 5 and there is no need for a further opening. The operation of the preferred embodiment of the support device may be more readily understood by reference to FIGS.

5 and 6 showing the reverse side of the preferred embodiment of the support device according to the present invention.

Referring to FIG. 5 there is shown a perspective view of the rear side of the support device 1 in which the shape of a cavity 15, provided in the hollow body portion 3 of the device, may be clearly seen. Passage 5 comprises first and second openings 21 and 23 located substantially opposite to one another on first and second sides of the device respectively. Passage 5 also communicates with the cavity 15 of the body portion 3. There is also provided a retaining means 13, located within the cavity 15, comprising an ear-shaped socket 27 in which one end of a cord provided with the device may be held. In this embodiment there is also provided a third opening 25 located at the bottom end of the device 1. The support device 1 may be made from any suitable material and is most economically made from a plastics material using a known moulding manufacturing process. It is preferable that the dimensions marked at A, B, C and D in FIG. 5 are manufactured so as to be less than the diameter of the cord provided with the device. This would facilitate holding of the cord in correct positions both during installation and after assembly.

However, for ease of manufacture, each of the gaps A, B, C and D may be equal to the maximum diameter of the respective openings so as to form U-shaped channels. A cord associated with the device would then be free to move out of the respective openings until the device was attached to a surface to enclose the cavity 15 of the device.

In FIG. 6 the device 1 is shown with the cord 7 in the preferred configuration. One end of the cord 7, which is preferably made from nylon, is molten to form an enlarged portion which is received in the socket 27 of the retaining means 13. The cord 7 extends from the retaining means 13 into the cavity 15 and out of the first opening 21 to form an internal loop 29 within the cavity 15. The other free end of the cord 7 forming the external loop 9 enters the second opening 23 on the opposite side of the device 1, passes through the internal loop 29 and out of the third opening 25 to form the cord tail 14. The interior loop 29 cooperates with the socket 27 to form a locking means 17 in this embodiment of the device 1. When the external loop 9 is pulled, the cord portion extending from the first opening 21 is pulled and tightens the loop 29 around cord portion 31, effectively preventing movement of the cord portion 31 and thereby locking the length of the external loop 9. If more force is applied to the external loop 9 this only further tightens the interior loop 29 locking the cord portion 31. If it is desired to change the length of the external loop 9 then the locking means 17 may be released by pulling on either the cord tail 14 or directly on the cord portion extending from the second opening 23, which has the effect of respectively shortening or lengthening the external loop 9.

The simple arrangement of the retaining means 13 and locking means 17 illustrated in FIG. 6 has been found to operate very well in practice provided that suitable cord 17 is employed. Although a nylon cord is used in this embodiment, any elongate flexible element such as a cable, a wire, a chain, a tape or cord of any other suitable flexible material may be employed. In applications where a large force will be applied to the exterior loop 9, for example when supporting a heavy object, alternative retaining means and locking means may be provided to ensure a secure support. The embodiment illustrated is advantageous insofar as it has no moving parts and requires only the addition of the cord 7 to be used, and a screw or bolt for passing through the hole 12 in order to attach the device 1 to a surface. However, in an alternative arrangement (not illustrated) the device may have a ratchet-type locking means for locking the external loop 9 when a force is applied thereto, but which may be released when the free end of cord 7 is pulled. Such a ratchet-type locking means is commonly used to lock window blinds in an open position. Similarly, the retaining means may be provided by a screw or nail to which the cord is tied.

Now that the basic configuration and operation of a preferred embodiment of the support device has been described, a very wide number of applications of the device will be immediately apparent. A number of possible applications are illustrated in FIGS. 3, 4, 8, 9, 10 and 11.

Referring to FIG. 3 there is illustrated one application of the support device 1 involving threading the external loop 9 of the cord through the handle of a common garden implement 32 and then lifting the loop 9 up over the hook member 11 of the device 1. The loop 9 is prevented from extending by means of the locking means 13 provided within the device 1 and in this way effectively providing two external loops with which an object may be supported. This method of employing the support device suggests a multitude of alternative domestic, garden, garage and other storage applications. One alternative application of the device using this method of support is illustrated in FIGS. 10 and 11. FIG. 10 shows a perspective view of a shelf supported by two support devices 1 attached to a wall. The loop 9 supported by the device extends downwards around the wooden shelf 33 and is hooked up over the hook member 11 of each device 1. FIG. 11 is a side view of the same shelving arrangement shown in FIG. 10. There is normally no problem with slippage unless substantial weight is concentrated on the outermost edge of the shelf. If this is considered a problem then a simple solution is the provision of a small plastic or metal fitting attached to the loop 9 near the outermost edge of the wooden shelf 33. Such a fitting 35 is illustrated in the enlarged portion shown in FIG. 11. The height of the shelf relative to the device 1 may be conveniently adjusted by lengthening or shortening the loop 9 in the manner previously described. Cord tails 14 may be cut off or tucked out of sight if necessary.

FIG. 4 illustrates an alternative manner of using the device according to the invention in which the loop 9 is used to directly support an object inserted therethrough. A brush 37 is placed with the handle inserted through the loop 9 which is tightened around the handle by pulling on the cord tail 14. Again many alternative applications may be envisaged using this method of supporting an object, including situations where the object is supported on the ground and requires means for preventing movement away from an adjacent wall. One or more of the devices 1 may be provided on the adjacent wall having their loops 9 extending around the object to be secured.

FIGS. 8 and 9 illustrate yet another application of the support device according to the present invention. In FIG. 8 there is shown a side view of a picture frame hung in a conventional manner, whereby the support wire of the picture frame is simply hooked over the hook member of the support device 1. The loop 9 is then available to support another object directly below the picture frame. FIG. 9 illustrates an alternative method of supporting a picture frame wherein the loop 9 of the support device 1 passes through cup hooks 37 provided on the back of the picture frame. This method of hanging a picture on the wall has the further advantage that the height of the picture may be conveniently adjusted by lengthening or shortening the loop 9 in the manner previously described. Pulling on the cord tail 14 will shorten the loop and thereby raise the picture to the required height.

The support device according to the present invention is not limited to applications requiring attachment to a vertical surface, and may also be conveniently attached to a horizontal surface such as a horizontal ceiling beam or other framework. FIG. 7 illustrates attachment of a device 1 to a horizontal surface using a nut and bolt 39 for improved security of the attachment to the surface. As with the applications previously described the loop 9 may be used to directly support an object or it may be extended around an object and hooked over the hook member 11 thereby effectively providing support by means of two loops instead of one. FIG. 7 also shows a transverse cross-section view taken through the device 1 at the point A, illustrating the triangulated shape of the section in line with the hole 12 through which a screw or bolt may be provided for attaching the device to a surface. The shape of this section gives increased strength to the device 1 at the point of attachment to a ceiling or wall surface. The support device 1 may be designed so that cord portions of the loop 9 pass as closely as practicable to the point A shown in FIG. 7, thereby minimizing the leverage applied to the device 1 about the point of attachment, and reducing the possibility of breakage.

In the preferred embodiment illustrated in the drawings the locking means 17 and the holding means 13 are both provided within the cavity 15 of the body portion 3 of the support device 1 thereby enabling the overall profile of the device 1 to be relatively unobtrusive. The smoothly contoured external surface of the support device 1 may be suitably coloured or decorated to match with the interior decor of the room in which it is to be used, and also virtually eliminates the possibility of bodily injury or damage to clothing when the device is not in use. The support device 1 according to the present invention may be manufactured in a variety of sizes and because of its relatively low profile it may be particularly useful in many marine applications because of the need to keep dangerous protrusions in the cockpit, deck areas or below decks to a minimum.

Now that a preferred embodiment of the invention has been described in detail it will be apparent that a number of alterations and modifications may be made without departing from the basic structure of the invention. For example, the shape of the passage and the cavity within the body of the device need not be as illustrated. Furthermore the means for holding an end of the elongate flexible element and the locking facility may be provided by alternative arrangements either internal or external to the body portion 3 of the device. The number and position of the openings communicating with the interior of the cavity 15 in the body portion 3 of the device need also not be as illustrated in the preferred embodiment.

All such modifications and variations are to be considered within the scope of the present invention the nature of which is to be determined from the foregoing description and the appended claims.

We claim:

1. An adjustable support device having a substantially planar face and having mounting means permitting said face to be abutted with and attached to a surface, said device comprising:
    a body portion having an elongate passage extending therethrough, said passage being adapted to receive an elongate flexible element therein;
    retaining means provided internally of the body portion and terminating with said passage for retaining one end of such an elongate flexible element therein whereby, in use, said elongate flexible element can be arranged in said passage and held at one end by said retaining means, a portion of said flexible element forming a loop external to, and supported by said device and wherein, in use, the length of said loop may be adjusted by pulling on a portion of the flexible element extending form said passage.

2. A device as claimed in claim 1, wherein said passage extends between first and second openings located substantially opposite to one another on first and second sides of th device respectively.

3. A device as claimed in claim 2, wherein a further opening is provided on a third side of the device which communicates with said passage.

4. A device as claimed in claim 3, provided with an elongate flexible element having one end held in said retaining means and having the other free end threaded through said first opening and said second opening to form a loop external to, and supported by, the device.

5. A device as claimed in claim 4, wherein said free end of the flexible element is also threaded through said further opening whereby, in use, pulling said free end shortens said external loop.

6. A device as claimed in claim 1, wherein there is further provided means for locking the flexible element whereby, in use, pulling on said external loop does not substantially alter the length of the external loop.

7. A device as claimed in claim 5, wherein said elongate flexible element is a cord.

8. A device as claimed in claim 7, wherein said retaining means comprises a socket adapted to receive an enlarged portion of said one end of the cord whereby, in use, when said device is attached to a surface said one end of the cord is held firmly in said socket.

9. A device as claimed in claim 8, wherein said socket is located adjacent to the first opening and said free end of the cord is threaded through said first opening to form an internal loop, and wherein the free end of the cord is threaded back in through said second opening, through said internal loop and back out again through said further opening whereby, in use, pulling on said external loop causes the internal loop to tighten around the cord and thus prevents lenthening of the external loop.

10. A device as claimed in claim 5, wherein there is further provided a hook member integral with said body portion and adapted to be capable, in use, of cooperating with said body portion to support said external loop.

* * * * *